(12) United States Patent
McClure

(10) Patent No.: US 7,999,933 B2
(45) Date of Patent: Aug. 16, 2011

(54) METHOD FOR CALIBRATING IMAGING SPECTROGRAPHS

(75) Inventor: Jason McClure, Acton, MA (US)

(73) Assignee: Princeton Instruments, Acton, MA (US)

( * ) Notice: Subject to any disclaimer, the term of this patent is extended or adjusted under 35 U.S.C. 154(b) by 57 days.

(21) Appl. No.: 12/541,586

(22) Filed: Aug. 14, 2009

(65) Prior Publication Data

US 2011/0037975 A1 Feb. 17, 2011

(51) Int. Cl.
 *G01J 3/00* (2006.01)
(52) U.S. Cl. ....................................... 356/300
(58) Field of Classification Search ............. 356/301, 356/72–73, 300; 702/104; 250/252.1
See application file for complete search history.

(56) References Cited

U.S. PATENT DOCUMENTS

| 5,303,165 | A | * | 4/1994 | Ganz et al. | ............. 356/319 |
| 6,362,878 | B1 | | 3/2002 | Wang et al. | |
| 6,700,661 | B1 | | 3/2004 | Cadell et al. | |
| 6,876,448 | B2 | | 4/2005 | Imura et al. | |
| 7,184,517 | B2 | | 2/2007 | Kern | |
| 7,339,665 | B2 | | 3/2008 | Imura | |
| 7,471,391 | B2 | | 12/2008 | Imura | |

OTHER PUBLICATIONS

H.M. Rietveld, "A Profile Refinement Method for Nuclear and Magnetic Structures," J. Appl. Cryst. (Jun. 1969), 2, 65-71.
Grant Thomson, et al., "Development of a hand-held forensic-lidar for standoff detection of chemicals", Review of Scientific Instruments, vol. 73, No. 12, Dec. 2002, pp. 4326-4328.
Paul Bristow, et al., "X-shooter Physical Model", Ground-based and Airborne Instrumentation for Astronomy II, edited by Ian S. McLean, et al., Proc. of SPIE vol. 7014, 70143X1-9 (2008).
Paul Bristow, et al., "Advanced Calibration Techniques for Astronomical Spectrographs", The Messenger 131—Mar. 2008, pp. 2-6.
European Search Report for App. Ser. No. 09012524.6-2217 dated May 12, 2010.

* cited by examiner

*Primary Examiner* — Tarifur Chowdhury
*Assistant Examiner* — Abdullahi Nur
(74) *Attorney, Agent, or Firm* — Caesar, Rivise, Bernstein, Cohen & Pokotilow, Ltd.

(57) ABSTRACT

Disclosed is a method for calibrating optical spectrographs, and in particular optical spectrographs having focal plane array detectors. The method comprises the steps of detecting a spectrum of a known source, referencing a table of known spectral wavelengths and relative intensities, and deriving a spectrograph model based on the spectrograph's physical properties to approximate the observed spectrum, wherein non-linear optimization techniques refine the theoretical model parameters, thereby minimizing the residual difference between observed and calculated spectral intensities in an iterative process producing a set of physical model parameters that best describe the modeling spectrograph for calibration of subsequent spectral acquisitions.

7 Claims, 3 Drawing Sheets

METHOD FOR CALIBRATING IMAGING SPECTROGRAPHS

BACKGROUND OF THE INVENTION

1. Field of Invention

The present invention relates to an improved method for calibrating optical spectrographs, and in particular optical spectrographs having focal plane array detectors.

2. Background

A spectrograph spatially disperses light focused at an entrance slit onto an exit focal plane, where it may be detected by a detector. A spectrograph is calibrated when the spatial position of the various wavelength components of the dispersed light at the exit focal plane is known with some degree of accuracy. A spectrograph with a focal plane array detector may be calibrated by placing a light source with a plurality of known emission wavelengths in front of the entrance slit, rotating the grating to some angle and noting the position(s) in the array where the detector is illuminated.

Traditional calibration methods require substantial user input, assume sophistication on the user's part, and provide limited feedback on the accuracy of the calibration across the spectral range. In addition, the accuracy of traditional routines is partially limited by the number of emission lines observed (herein referred to as observables) at a given grating angle as a result of quantifying the calibration in wavelength space, e.g. a direct wavelength to detector pixel coordinate correlation. Moreover, it is easy for a user to collect data with an uncalibrated instrument. In the best case, post-acquisition spectral calibration is tedious; in the worst case, the data are invalid and the experiment must be repeated. Patents and publications in this field include: U.S. Pat. Nos. 7,339,665; 6,876,448; 6,700,661, and 6,362,878; and U.S. Patent Application Pub. no. 2006/0290929. All references cited herein are incorporated by reference.

A need exists, therefore, for an improved calibration method for optical spectrographs.

BRIEF SUMMARY OF THE INVENTION

Disclosed is a method for calibrating optical spectrographs and in particular optical spectrographs having focal plane array detectors. The method includes the steps of: detecting an observed spectrum of a known source, for example, an emission line source, a previously calibrated Raman or fluorescence spectrum, or spectrum from a NIST calibrated intensity standard; referencing a table of known emission line wavelengths and known relative intensities, or known Raman vibration frequencies and relative intensities, or known intensity spectrum from a NIST calibrated intensity standard; deriving a spectrograph model in terms of instrument parameters based on the spectrograph's physical properties to approximate the observed spectrum; forming an intensity function based on the model spectrograph parameters which yields spectral intensities for each pixel in the array detector and refining the spectrograph model parameters with a residual function to minimize residual difference between observed spectral intensities and spectral intensities calculated based on the intensity function. In an embodiment, the optical spectrograph comprises focal plane array detectors.

In a further embodiment, the step of detecting an observed spectrum includes measuring a number of observables equal to the number of horizontal plane pixels.

In a further embodiment, the step of refining spectrograph model parameters comprises using a function-fitting technique that functions in intensity space.

In a further embodiment, the spectrograph variable model parameters comprise spectrograph focal length, inclusion angle, and detector tilt angle.

In a further embodiment, the residual function is solved to obtain model parameters that minimize the residual differences across the observed spectrum.

In a further embodiment, the intensity function represents a wavelength to pixel location correlation.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Disclosed is a method for calibrating optical spectrographs and in particular optical spectrographs having focal plane array detectors. The method comprises the steps of detecting the spectrum of a known source, referencing a table of known wavelengths and relative intensities, and deriving a spectrograph model based on the spectrograph's physical properties to approximate the observed spectrum, wherein non-linear optimization techniques refine the theoretical model parameters, thereby minimizing the residual difference between observed and calculated spectral intensities in an iterative process producing a set of physical model parameters that best describe the modeling spectrograph for calibration of subsequent spectral acquisitions.

The step of determining the model parameters that best describe the physical instrument is performed by using a function-fitting technique that operates in intensity space where the number of observables is always equal to the number of pixels in horizontal plane of the detector. The number of pixels (hundreds to thousands) is always greater than the number of variable model parameters (single digits), thus allowing for a more accurate modeling of the observed spectrum. This departs from traditional methods where the maximum number of observables equals the number of emission lines observed in a single spectrum. A similar method, used in the field of crystal structure modeling is the Rietveld refinement technique. See, U.S. Pat. No. 7,184,517. Both the Rietveld technique and the present method refine over intensity space. Both methods do this for the same reasons, to maximize the number of observables relative to variable parameters.

An intensity function is derived that describes the entire spectrum to be measured by the instrument as acquired by an array detector placed at the focal plane of the spectrograph. The intensity function includes a number of parameters used to model the spectrograph. For instance, three such parameters might be detector pixel width, diffracting order and grating groove spacing. A residual function relates intensity differences between the calculated intensity at each pixel using the intensity function and the actual intensity as observed. The residual function is minimized with respect to the model parameters thus giving a set of model parameters that reduces the residual differences between the calculated and observed spectra. With the calculated model parameters inserted into the intensity function, the intensity function contains wavelength-to-pixel correlation that is then used to correct measurements taken by the spectrometer.

The disclosed method typically results in an order of magnitude better calibration for certain instruments over traditional methods.

Figure 1:
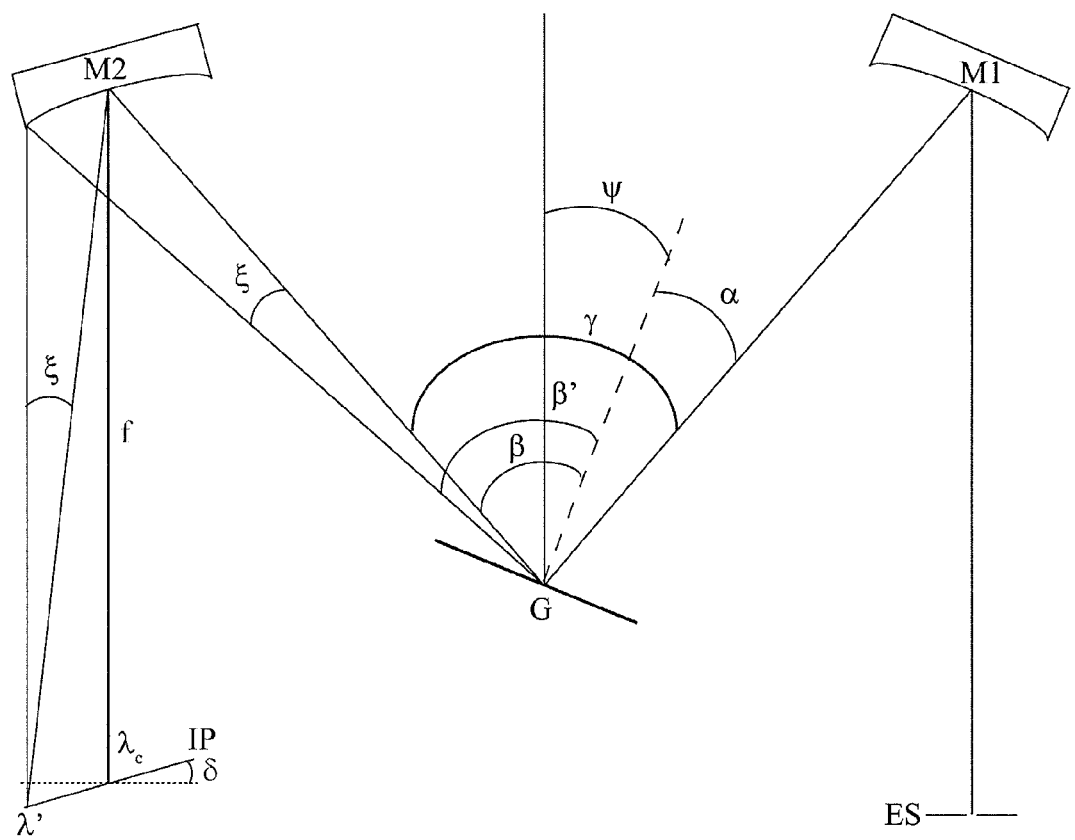
FIG. 1 is a schematic of an imaging spectrograph.
Figure 2:
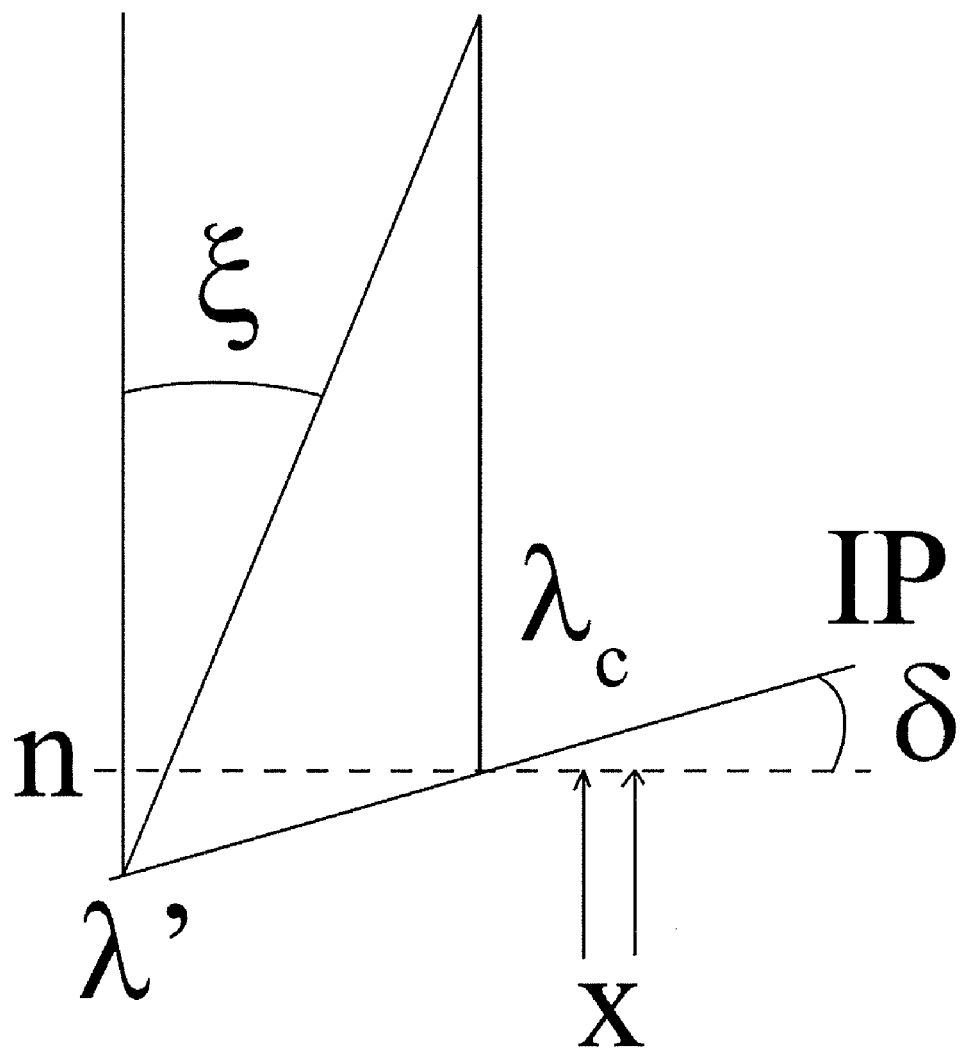
FIG. 2 is an enlarged diagram of the image plane of FIG. 1.

FIG. 1 is a schematic diagram of an imaging spectrograph. The referenced elements are defined as follows:

The light path in the diagramed imaging spectrograph is described in terms of its physical components listed in the forthcoming table. Light incident onto entrance slit ES is collimated by mirror M1 having focal length f onto the grating G. Diffracted rays leaving the grating form a wavelength dispersed image of the entrance slit at image plane IP by reflection at focusing mirror M2 having focal length f.

The image formed at IP is modeled in terms of a set of instrument parameters. Collimated light leaving M1 makes an angle $\alpha$ with respect to (wrt) the grating normal. The grating angle $\psi$ is measured relative to the line that bisects the spectrograph and the grating normal. Light diffracted by the grating having central diffracting wavelength $\lambda_c$ makes an angle $\beta$ wrt the grating normal and strikes the center of IP. The angle relating $\alpha$ and $\beta$ is termed $\gamma$, the inclusion angle, where $\gamma=\alpha+\beta$. Light diffracted at any wavelength other than $\lambda_c$ is termed $\lambda'$ and makes an angle $\beta'$ wrt the grating normal and differs from $\beta$ by the angle $\xi$. The angle $\xi$ is related to the detector pixel coordinate n, pixel width x, IP angle $\delta$, and mirror focal length f as shown by equation 1.

Physical Components:
ES . . . Entrance Slit
M . . . Collimating Mirror
M2 . . . Focusing Mirror
G . . . Grating
IP . . . Image Plane
Instrumental Parameters Relative to Refinement Method
$\alpha$ . . . . Angle of light Incidence
$\psi$ . . . Grating Angle
$\gamma$ . . . Inclusion Angle*
$\beta$ . . . Central Diffracting Angle
$\gamma'$ . . . Dispersed Diffracting Angle
$\xi$ Angle between central diffracting ray and dispersed ray
$\delta$ . . . Image Plane Angle*
$\lambda_c$ . . . Center Diffracted Ray Wavelength
$\lambda'$ . . . Diffracted Ray Wavelength at Pixel Coordinate n
f . . . Instrumental Focal Length*
n . . . Detector pixel coordinate number
x . . . Detector Pixel width Items marked with an asterisk (*) indicate variable model parameters in the Intensity Function, equation 2, below, that are adjusted in the refinement method.

In an exemplary calibration method, a process is applied that refines a generalized model of a Czerny-Turner type imaging spectrograph using non-linear optimization techniques. The spectrograph model parameters are related to physical properties of the instrument such as, the focal length of the mirrors (f), included angle between the primary focusing and collimating mirrors ($\gamma$), and the tilt to the image plane ($\delta$). A relationship between the wavelength of dispersed light ($\lambda'$) and pixel coordinate (n) is derived as equation 1. Certain model parameters such as f, $\gamma$, and $\delta$ are varied using non-linear optimization methods until the best match between calculated and observed spectral intensities is achieved.

$$\lambda'(n, \psi; f\gamma\delta) = \left(\frac{d}{m}\right)\left\{\sin\left(\psi - \frac{\gamma}{2}\right) + \sin\left(\psi + \frac{\gamma}{2} + \xi\right)\right\} \quad (1)$$

-continued $$\text{Where: } \psi_i = \sin^{-1}\left(\frac{m\lambda_{c_i}}{2d\cos\left(\frac{\gamma}{2}\right)}\right) \text{ and } \xi = \tan^{-1}\left(\frac{nx\cos\delta}{f + nx\sin\delta}\right)$$

An intensity function is derived that describes the entire spectrum acquired by an array detector placed at the focal plane of the spectrograph for a particular grating angle $\psi_j$. The intensity function, listed as equation 2, contains all of the aforementioned physical model parameters describing the spectrograph. The wavelengths ($\lambda_i$) and relative intensities ($I_{rel i}$) used in the intensity function correspond to the wavelengths and relative intensities of the known source and are stored in a lookup table.

$$I_{\psi_j}(\lambda'(n, \psi; f\gamma\delta)) = I_o + \sum_{i=1}^{n} I_{rel_i} e^{-(\lambda'(n)-\lambda_i)^2/2\sigma^2} \quad (2)$$

Where:
$\sigma$=FWHM of observed spectral features
$\lambda_i$=wavelength of the i'th spectral feature from lookup table
$I_{rel i}$=relative intensity of the i'th spectral feature from lookup table By varying the model parameters, the intensity function is globally affected and therefore the peak positions of all calculated spectral features are affected as well. From this point, a method for calibrating a spectrograph utilizing the entire observed spectrum is realized.

A residual function $d\beta_k$, listed as equation 3, relates the intensity difference between the calculated and observed spectra and is evaluated at every pixel k in the array detector array for a particular grating angle $\psi_j$.

$$d\beta_k = I_{obs} - I_{104_j}(\lambda'(n,\psi;f\gamma\delta)) \quad (3)$$

Where: $d\beta_k = A_{kl} d\Phi$

In each refinement iteration, the amount and direction with which to adjust the model parameters in order that $d\beta_k$ is minimized must be calculated. The Jacobian matrix of the intensity function, $A_{kl}$, listed as equation 4, is derived for all variable model parameters $\phi$ and evaluated over all pixels in the detector array.

$$A_{kl} = \begin{vmatrix} \left(\frac{\partial I_{calc}}{\partial f}\right)_{n_1} & \left(\frac{\partial I_{calc}}{\partial \gamma}\right)_{n_1} & \cdots & \left(\frac{\partial I_{calc}}{\partial \phi}\right)_{n_1} \\ \left(\frac{\partial I_{calc}}{\partial f}\right)_{n_2} & \left(\frac{\partial I_{calc}}{\partial \gamma}\right)_{n_2} & \cdots & \left(\frac{\partial I_{calc}}{\partial \phi}\right)_{n_2} \\ \left(\frac{\partial I_{calc}}{\partial f}\right)_{n_k} & \left(\frac{\partial I_{calc}}{\partial \gamma}\right)_{n_k} & \cdots & \left(\frac{\partial I_{calc}}{\partial \phi}\right)_{n_k} \end{vmatrix} \quad (4)$$

Where: $I_{calc} = I_{\psi_l}(\lambda'(n, \psi; f\gamma\delta))$

Finally, the residual function in equation 3 is solved for $d\phi$ yielding the necessary adjustments for the model parameters per iteration listed as equation 5.

$$\begin{bmatrix} df \\ d\gamma \\ \vdots \\ d\phi \end{bmatrix} = (A'_{kl} \cdot A_{kl})^{-1} A'_{kl} \begin{bmatrix} \Delta I_{\psi_j}(\lambda'(n_1)) \\ \Delta I_{\psi_j}(\lambda'(n_2)) \\ \vdots \\ \Delta I_{\psi_j}(\lambda'(n_k)) \end{bmatrix} \quad (5)$$

Where: $\Delta I_{\psi_j}(\lambda'(n_1)) = I_{obs} - I_{\psi_j}(\lambda'(n, \psi; f\gamma\delta))$ The resulting intensity function now implicitly contains a wavelength-to-detector pixel correlation that is extracted for calibration of subsequent spectral measurements. Additionally, accurate model parameters are determined that are used to model observed spectra at arbitrary grating angles.

Movement of the spectrograph's grating to different angles, thereby allowing different wavelength ranges to be sampled, decreases the accuracy which the central wavelength ($\lambda_c$ in equation 1) is known because of uncertainties in the mechanical drive system. Additionally, the refinement process causes changes in the calculated center wavelength that must be corrected after each refinement cycle. This problem is circumvented by a search/match process that determines the physical grating angle and thus the center wavelength $\lambda_c$.

In the search/match process, the intensity function (equation 2), is treated as an orthonormal vector that spans the total wavelength space accessible by the spectrograph.

Once normalized for a particular grating angle $\psi_j$, the intensity function is derived as equation 6.

$$I_o + \sum_{i=1}^{n} I_{rel_i} e^{-(\lambda'(n)-\lambda_i)^2/2\sigma^2} \Rightarrow |I\rangle_{\psi_j} \quad (6)$$

Where: $\langle I_{\psi_i} | I_{\psi_j} \rangle = 1$
$\langle I_{\psi_i} | I_{obs} \rangle = P(\psi)$ The inner product of this intensity function with an observed spectrum now returns the probability P of being at a given grating angle $\psi$. This operation is extended over the range of all of possible grating angles, and results in a probability distribution centered about the most probable grating angle. The most probable value for $\psi$ is obtained and the value updated in the model.

Figure 3:
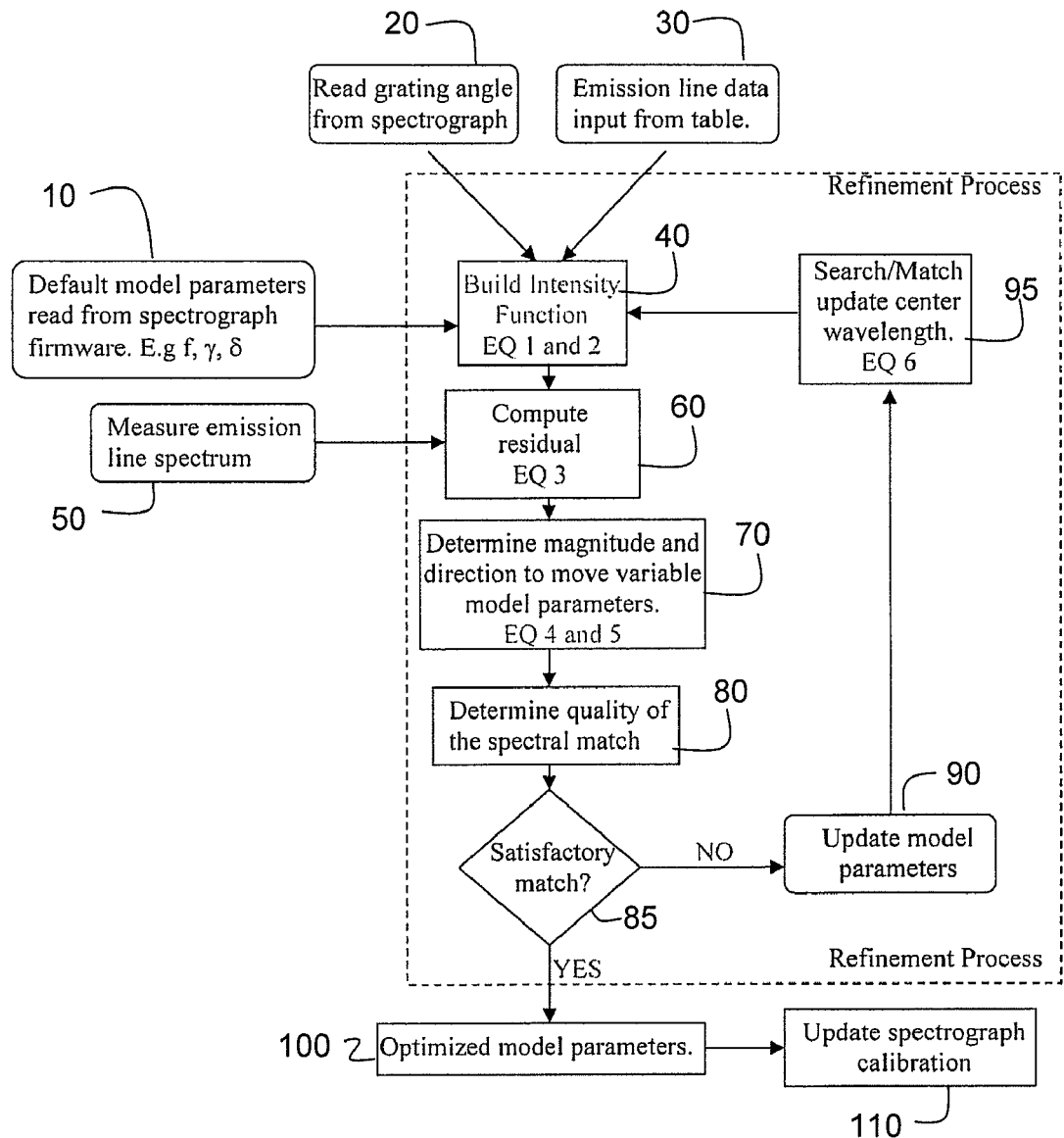
FIG. 3 is a flow diagram of an exemplary method of calibrating an imaging spectrograph.

FIG. 3 is a flow chart of an exemplary method as described above. The dashed line indicates procedures that are performed in conjunction with the refinement process. Before the refinement begins, default model parameters are read from the spectrometer's firmware or look up table 10, the current grating angle is obtained 20, and an emission line table or calibrated spectrum is loaded 30. The first step in the process is the construction of the intensity function 40. This step mathematically corresponds to equations 1 and 2 in the previous derivation. Next, a spectrum is acquired 50 and shown as an adjacent process block outside the refinement process group (dashed line). The residual function is then computed 60. From the residual function, the magnitude and direction to adjust the model parameters is determined 70.

After applying the adjustments, equations 4 and 5, a check is made to determine the accuracy of the overall fit 80, 85. At this point the refinement process either terminates with the best set of model parameters 110 and the spectrograph calibration is updated 110 or the model parameters are updated 90 and the refinement process continues to the search/match process 95. This step, 95, is added to account for the fact that as the model parameters change during the refinement process, the calculated central diffracting wavelength will change as a result. Following step 95, a refined grating angle is determined, the intensity function rebuilt, and the process repeats.

While the invention has been described in detail and with reference to specific examples thereof, it will be apparent to one skilled in the art that various changes and modifications can be made therein without departing from the spirit and scope thereof.

What is claimed is:

1. A method for calibrating an optical spectrograph adapted to disperse light in a horizontal plane, having physical properties and a detector having a predetermined number of horizontal plane pixels, comprising the steps of:
    detecting a spectrum of a known source;
    referencing a table of known emission line wavelengths and known relative intensities, or known Raman vibration frequencies and relative intensities, or known intensity spectrum from a NIST calibrated intensity standard;
    deriving a spectrograph model in terms of model parameters based on the physical properties of the modeling spectrograph, using a function-fitting technique that functions in intensity space to approximate the observed spectrum;
    forming a single intensity function based on said model spectrograph parameters and
    refining said spectrograph model parameters with a residual function to minimize residual difference between observed spectral intensities and spectral intensities calculated based on said intensity function.

2. The method of claim 1, wherein the optical spectrograph comprises focal plane array detectors.

3. The method of claim 1, wherein the step of detecting an observed spectrum includes measuring a number of observables that is always equal to the number of horizontal plane pixels.

4. The method of claim 1, wherein said spectrograph model parameters comprise the focal length of the mirrors (f), included angle between the primary focusing and collimating mirrors ($\gamma$), and the tilt to the image plane ($\delta$).

5. The method of claim 1, wherein said residual function is solved to obtain model parameters that are correlated to the spectrograph that minimize the residual differences across said observed spectrum.

6. The method of claim 1, wherein said the intensity function represents a wavelength-to-pixel location correlation.

7. The method of claim 1, wherein in said known source is selected from the group consisting of an emission line source, a previously calibrated Raman or fluorescence spectrum, and a spectrum from a NIST calibrated intensity standard.

* * * * *